United States Patent [19]

Kirkendall

[11] Patent Number: 5,049,166

[45] Date of Patent: Sep. 17, 1991

[54] LIGHT WEIGHT ABRASIVE TUMBLING MEDIA AND METHOD OF MAKING SAME

[75] Inventor: Gregory S. Kirkendall, Lake Wales, Fla.

[73] Assignee: Washington Mills Ceramics Corporation, North Grafton, Mass.

[21] Appl. No.: 485,955

[22] Filed: Feb. 27, 1990

[51] Int. Cl.$^5$ .............................. B24D 3/00
[52] U.S. Cl. ...................... 51/293; 51/308; 51/309
[58] Field of Search ................ 51/293, 308, 309

[56] References Cited

U.S. PATENT DOCUMENTS

| | | | |
|---|---|---|---|
| 2,194,472 | 3/1940 | Jackson | 51/185 |
| 2,455,509 | 12/1948 | Luaces | 18/55 |
| 2,464,746 | 3/1949 | Gering | 18/55 |
| 2,601,200 | 6/1952 | Amos et al. | 164/17 |
| 2,717,419 | 9/1955 | Dickey | 18/9 |
| 2,729,855 | 1/1956 | Titus et al. | 18/55 |
| 2,887,725 | 5/1959 | Vickers et al. | 18/47.5 |
| 3,202,746 | 8/1965 | Day et al. | 264/141 |
| 3,300,815 | 1/1967 | Rohaus et al. | 18/21 |
| 3,401,490 | 9/1968 | Mora | 51/295 |
| 3,478,138 | 11/1969 | Friesner | 264/145 |
| 3,549,336 | 12/1970 | Hodel | 23/313 |
| 3,549,341 | 12/1970 | Kittredge et al. | 51/293 |
| 3,615,811 | 10/1971 | Barrett | 501/27 |
| 3,670,467 | 6/1972 | Walker | 51/298 |
| 3,715,314 | 2/1973 | Morgenstern | 252/95 |
| 3,859,407 | 1/1975 | Blanding et al. | 264/62 |
| 4,054,425 | 10/1977 | Sherman | 51/293 |
| 4,101,330 | 7/1978 | Burk et al. | 501/143 |
| 4,261,706 | 4/1981 | Blanding et al. | 51/295 |
| 4,389,178 | 6/1983 | Komarek | 425/237 |
| 4,447,992 | 5/1984 | Bergquist | 51/163 |
| 4,736,548 | 4/1988 | Atkinson et al. | 51/309 |
| 4,761,163 | 8/1988 | Messere | 51/293 |
| 4,775,393 | 10/1988 | Boecker et al. | 51/309 |
| 4,932,166 | 6/1990 | Boecker et al. | 51/293 |
| 4,991,359 | 2/1991 | Ogitani | 51/293 |

*Primary Examiner*—William R. Dixon, Jr.
*Assistant Examiner*—Willie J. Thompson
*Attorney, Agent, or Firm*—Michael L. Dunn; Anna E. Mack

[57] ABSTRACT

The present invention provides a method for manufacturing light weight abrasive tumbling media made up of discrete abrasive particles desirably exhibiting an essentially uniform size and shape which comprises adding at least 15%, and preferably 20% by weight of a naturally occurring or synthetically produced metal carbonate to a ceramic/clay based formable mixture prior to firing to obtain particles having a final fired bulk density below 65 lbs/ft$^3$. Such a carbonate may desirably be selected from the group consisting of calcium carbonate, lithium carbonate, magnesium carbonate, zinc carbonate or compounds containing a predominant amount of one or more of these carbonates.

10 Claims, No Drawings

LIGHT WEIGHT ABRASIVE TUMBLING MEDIA AND METHOD OF MAKING SAME

BACKGROUND OF THE INVENTION

1. Technical Field

This invention relates to light weight abrasive tumbling media for use in mass industrial finishing operations and to methods of making same. More particularly, this invention relates to the production of ceramic tumbling media consisting of discrete abrasive particles of essentially uniform size and shape which exhibit a final bulk density after firing below 65 lbs/ft$^3$.

2. State of the Art

Abrasive tumbling media have long been used in mass industrial finishing operations for refining the surfaces of metallic and plastic parts. Such media have customarily included discrete abrasive particles of various sizes and shapes made from ceramics, porcelains, natural or synthetic stone, clay, and plastics. Conventional ceramic tumbling media exhibit a bulk density of 80 to 120 lbs/ft$^3$ which can damage delicate parts during mass finishing operations. Plastic tumbling media having a significantly lower bulk density have commonly been used for such operations, but plastic gives off an undesirable effluent during production which is harmful to the environment and which may require treatment as a hazardous waste. Accordingly, there exists a need for improved light weight, low density ceramic tumbling media the production or use of which is not detrimental to the environment.

Therefore, it is an object of the present invention to provide improved low density ceramic tumbling media suitable for refining or finishing delicate industrial parts.

It is a further object of this invention to provide improved low density abrasive tumbling media having a final fired bulk density below 65 lbs/ft$^3$.

It is still a further object of the invention to provide light weight ceramic tumbling media, the production or use of which is not detrimental to the environment.

These and other objects are accomplished herein by adding at least 15%, and preferably 20% by weight of a naturally occurring or synthetically produced metallic carbonate to a ceramic/clay based formable mixture normally used in making conventional abrasive particles. Examples of such carbonates include calcium carbonate, lithium carbonate, magnesium carbonate, zinc carbonate or compositions containing a predominant amount of one or more of these carbonates. The carbonate is added to the mixture prior to formation. Once formed, the particles are fired at temperatures in the range of 1130° C. to 1150° C. to produce finished discrete particles desirably having an essentially uniform size and shape which exhibit a final bulk density below 65 lbs/ft$^3$. The carbonate undergoes decomposition at customary firing temperatures leaving fine pores in the media which accounts for the lowering of the bulk density.

DETAILED DESCRIPTION OF THE INVENTION

The present invention provides a method for manufacturing light weight abrasive tumbling media consisting of discrete abrasive particles desirably exhibiting an essentially uniform size and shape made by firing a formable mixture primarily comprising a clay, a ceramic and mixtures thereof. The method comprises adding at least 15%, and preferably 20% by weight of a naturally occurring or synthetically produced metal carbonate to the ceramic/clay based formable mixture prior to firing to obtain particles having a final fired bulk density below 65 lbs/ft$^3$. A suitable carbonate may desirably be selected from the group consisting of calcium carbonate, lithium carbonate, magnesium carbonate, zinc carbonate or compounds containing a predominant amount of one or more of these carbonate salts.

The term "metal or metallic carbonate" as used herein refers to carbonates of one or more Group I through IIIA metals of the Periodic Table of Elements, including transition metals to the extent that such carbonates exist and are stable at room temperature. Such carbonates may exist in their naturally occurring forms, for example, calcite, or may be synthetically produced. A naturally occurring or synthetically produced compound containing a predominant amount of one or more of these salts as its base, such as ground marble containing calcium carbonate with admixtures of iron, magnesium and/or other minerals and fillers, would also be included within the definition of the term "metal carbonate". Desirable carbonates may include carbonates which upon decomposition form a refractory oxide, e.g. zirconium carbonate.

The most preferred metallic carbonate used in the practice of this invention due to its effectiveness and availability is calcium carbonate ($CaCO_3$). For simplicity and convenience, this invention will be described in connection with this salt, it being understood that $CaCO_3$ is merely intended in an illustrative sense and is not intended to be limitative.

The tumbling media produced by the method of this invention may be manufactured into any desired linear symmetrical or nonsymmetrical shape, including pyramids, spheres, cylinders, triangles, tri-stars, diamonds, arrowheads and ellipses, depending upon the desired end use. When cone shaped particles are contemplated, typically they will be produced in one of three sizes (i.e., $\frac{1}{2}''$ w $\times \frac{5}{8}''$ h, $\frac{3}{4}''$ w $\times \frac{7}{8}''$ h and $1\frac{1}{8}''$ w $\times 1\frac{1}{4}''$ h, plus or minus 0.020", however, size may vary depending upon end use application. The base of the cone is essentially smooth and flat and the apex of the cone is curvedly tapered to a rounded point. Desirable shapes are those that provide a plurality of working edges so as to be capable of applying fast, effective abrasion without lodging, chipping and causing environmental problems. The light weight media produced herein offer the added advantage of being suitable for use with parts which require delicate finishing such as aircraft engine and structural parts, automotive parts, golf clubs, jewelry, silverware, special aluminas and steels, that are easily deformed and impinged by conventional high density media.

The abrasive particles in accord with this invention are typically made from a ceramic/clay based formable or plastic mixture. The mixture is prepared as a flowable plastic mass which is extruded through one or more dies having the desired shape (e.g., triangular, cylindrical, etc.) to form a continuous rod or cylinder which may then be cut into any desired length. Or, alternatively, the continuous extruded rod may be further formed into other desired shapes (e.g., conical), by feeding it through a pair of cooperating mechanical forming members preferably mounted on opposing continuous rolls having recesses engraved or carved therein corresponding to the shape of particle desired. Preferably, the mixture is fed through the forming members as a rod or ribbon having a sufficient plasticity to ensure formability. Plasticity is measured by the percent of moisture contained in the mixture. Desirably, the moisture content will range from 12% to 18%. As the rod or ribbon passes between the cooperating forming members there is produced a plurality of discrete particles having an essentially uniform size and shape.

"Clay" as used herein means a mixture of powdered raw materials after water is added and the product is mixed (before drying and firing processes). "Ceramic" as used herein means that the basic raw materials are of the type used to manufacture various ceramic products. After the product is fired, it then becomes a vitrified ceramic.

Any known flowable ceramic based formulation may be used in forming the light weight particles of this invention. Generally, a conventional formulation will contain some or all of the following ingredients: ball clay, kaolin, bentonite, feldspar, talc, alumina, emery, quartz, silicon carbide, silicon and/or synthetic emery. These materials are finely divided and blended together to form an essentially homogenous mixture. Many known additives may also be incorporated into the mixture including other abrasives such as titanium carbide, zirconia, metallic particles such as tin or zinc, metal oxides, carbides and nitrides, fillers combined with abrasives such as silicon carbide, emery (synthetic or natural) and aluminum oxide. Commercially available lubricants including additive A (extrusion aid) may also be added along with various plasticizers and binding agents including but not limited to the following: ball clay, kaolin and bentonite clays.

The prior art discloses numerous ceramic compositions suitable for producing tumbling media which are formulated to have a sufficient viscosity to be flowable yet able to maintain their shape once formed. Accordingly, the invention herein is not intended to be limited to a particular ceramic composition. After formation, the discrete particles are fired at temperatures between 1130° C. to 1150° C. to produce final particles having the desired rigidity and hardness for a particular end use application.

Preferred formulations for producing the light weight particle of this invention is as follows:

| ITEM | RAW MATERIALS | PREFERRED COMPOSITION | PREFERRED RANGE |
| --- | --- | --- | --- |
| 1 | Ball Clay | 26.68% | 20 to 30 |
| 2 | Kaolin | 10.66% | 5 to 15 |
| 3 | Bentonite | 4.00% | 2 to 8 |
| 4 | Feldspar | 26.66% | 20 to 30 |
| 5 | Talc | 4.00% | 2 to 8 |
| 6 | Silica | 8.00% | 4 to 12 |
| 7 | Calcium Carbonate | 20.00% | 15 to 25 |

As is well known in the art, the above preferred formulations may be adjusted for different firing temperatures. For example, if a higher firing temperature is desirable, the percentages of feldspar, silica and calcium carbonate may be decreased and the percentages of ball clay, kaolin and talc may be increased to produce the required rigidity and hardness of the final product. For a lower firing temperature, this procedure would be reversed.

The percentages of items 1, 2 and 3 may vary as long as the total percentage does not go above approximately 40%. In addition, the total percentage of items 4 and 6 should likewise not go above approximately 40%.

The percentage of calcium carbonate used may range from 15% to 25%. This is also affected by firing temperature and particle size. The particle sizes of the raw materials used is very important. For example, if the particle size increases, the lightweight media may be produced at a higher temperature and the opposite would result for decreased particle sizes.

On a weight percent basis, it is preferred that the metallic salt or carbonate be present in an amount from between 15% to 25% and more preferably, at least about 20% of the metallic salt or carbonate should be present in the formulation. Below about 15% the desired lowering of the bulk density may not be readily achieved. Above about 25% the finished particles may be too porous to maintain the necessary rigidity and hardness.

The amount of carbonate containing compounds such as crushed marble to be added to the formable mixture will vary depending upon the amount of pure calcium carbonate present in the added compound. With these formulations appropriate stoichiometric substitutions may be determined on a case by case basis as is well known in the art.

EXAMPLE 1

Light weight abrasive conical tumbling media were prepared in two different sized shapes ($\frac{3}{4}'' \times \frac{3}{8}''$ conical and $\frac{3}{8}'' \times \frac{3}{8}''$ triangular) from a formable mixture consisting of the following ingredients:

| | |
| --- | --- |
| Ball clay | 400 lbs |
| Kaolin | 160 lbs |
| Bentonite | 60 lbs |
| Feldspar | 400 lbs |
| Talc | 60 lbs |
| Silica | 120 lbs |
| Calcium Carbonate | 300 lbs |
| | 1500 lbs |

The particles formed were separated and fired in a Swindell and Dressler Tunnel Kiln at a maximum temperature of 1150° C. for a total cycle time of 18 hours. After firing, the particles were cooled and the bulk density was determined by suspending the particles in water as follows:

Five random samples taken from a production run were weighed dry (dry=D) on an O Haus Centogram balance, 311 gram capacity. These pieces were placed in a container having a screen preferably about 1" from the container bottom to hold the pieces in a suspended state. The pieces in the container were boiled for two hours and remained soaking in this water for 24 hours. The pieces were removed from the container, and then weighed while suspended in a crucible of water (suspended=S). They were then weighed again wet, i.e., "wet" meaning excess water is removed from the outside surface of each piece (wet=w).

Table 1 lists the bulk densities determined for five random samples taken from each run.

TABLE 1

| Sample | Dry(D) | Suspended in Water(S) | Wet(W) | Volume<sup>a</sup> (V) | Porosity<sup>b</sup> | Bulk Density<sup>c</sup> |
| --- | --- | --- | --- | --- | --- | --- |
| | | | ⅜ × ⅜ cn - Lw | | | |
| 1 | 7.33 | 4.45 | 8.57 | 4.12 | 30.18 | 1.78 |
| 2 | 7.30 | 4.43 | 8.45 | 4.02 | 28.61 | 1.82 |
| 3 | 7.50 | 4.53 | 8.46 | 3.93 | 24.43 | 1.91 |
| 4 | 7.38 | 4.49 | 8.64 | 4.15 | 30.36 | 1.78 |
| 5 | 7.29 | 4.39 | 8.58 | 4.19 | 30.79 | 1.74 |
| AVERAGE | | | | 4.08 | 26.76 | 1.80 |
| | | | ⅜ × ⅜ AT25 - LW | | | |
| 1 | 4.39 | 2.65 | 5.07 | 2.42 | 28.09 | 1.81 |
| 2 | 3.94 | 2.40 | 4.60 | 2.20 | 30.00 | 1.79 |
| 3 | 4.10 | 2.50 | 4.80 | 2.30 | 30.43 | 1.78 |
| 4 | 4.00 | 2.43 | 4.65 | 2.22 | 29.28 | 1.80 |
| 5 | 3.87 | 2.36 | 4.60 | 2.24 | 32.59 | 1.73 |
| AVERAGE | | | | 2.28 | 30.08 | 1.78 |

<sup>a</sup>Volume = W − S
<sup>b</sup>Porosity = W − D ÷ V × 100
<sup>c</sup>Bulk Density = D ÷ V

EXAMPLE 2

Conventional fine grained, extremely hard tumbling media, exhibiting an impact resistance of about 85 lbs/cu. ft, were also prepared as described in Example 1 from a formable mixture consisting of the following ingredients:

| Composition 10 | |
| --- | --- |
| Ball clay | 33.4% |
| Kaolin | 13.3% |
| Bentonite | 5.0% |
| Feldspar | 33.3% |
| Talc | 5.0% |
| Silica | 10.0% |
| Total | 100.0% |

Table 2 compares the volume, porosity and bulk density values for triangular media made from the conventional formulation with those made from the light weight composition. The triangular particles produced measured ⅞ × ⅜".

TABLE 2

| | Conventional Composition | | | Light Weight Composition | | |
| --- | --- | --- | --- | --- | --- | --- |
| Sample | Volume | Porosity | Bulk Density | Volume | Porosity | Bulk Density |
| 1 | 1.91 | .52 | 2.45 | 2.57 | 29.57 | 1.78 |
| 2 | 1.90 | 1.05 | 2.47 | 2.55 | 29.02 | 1.82 |
| 3 | 2.00 | .50 | 2.37 | 2.42 | 26.03 | 1.89 |
| 4 | 1.90 | .52 | 2.44 | 2.57 | 30.74 | 1.73 |
| 5 | 1.88 | .53 | 2.45 | 2.50 | 29.20 | 1.92 |
| AVERAGE | 1.92 | .62 | 2.44 | 2.52 | 28.91 | 1.84 |

EXAMPLE 3

Conventional and light weight conical tumbling media used in the mass finishing of aluminum parts prepared as in Examples 1 and 2 were compared with regard to media loss, metal loss, efficiency and chipping or fracturing. A Harperizer grinding test using aluminum angle was performed as follows.

A Harperizer consisting of two drums mounted on the periphery of a turret, was loaded with a test sample comprising 1,860 grams of tumbling media and 150 grams of angle iron. The turret was rotated at a high speed (12 g's) building up centrifugal force and compressing the parts and media into a tightly compacted mass. Meanwhile, the drums were counter-rotated at a slower speed causing a smooth sliding action of the media against the parts. Water flows continuously through the system at a rate of about 1 gallon per minute. This rate is measured by a flow meter. The rotation of the turret and the speed of the barrel are fixed by the manufacturer of this equipment. The test sample placed in the barrel was processed in the Harperizer for 1 hour. The Harperizer automatically shuts down at the end of the 1 hour time interval. Both the media and the metal were then placed in a container and dried utilizing a centrifugal dryer for approximately 3 to 5 minutes. When completely dried, the metal and media were weighed separately. Their weight losses were then calculated into percentages and recorded. Small chips remaining in the container were weighed and the percent recorded to highlight any potential chipping problems.

The media loss was calculated by subtracting the media finish weight from the media start weight and dividing that total by the start weight. The metal loss was calculated by subtracting the metal finish weight from the metal start weight and dividing that total by the start weight. The efficiency of the system was calculated by dividing media loss into metal loss. The percent shipping loss was obtained by weighing the chips separately from the media to get a total chip weight which is then divided by the media loss weight. An unacceptably high chipping level was determined to be above 0.50% for both the conventional composition and the light weight composition.

The results of the Harperizer test are summarized in Table 3 below.

TABLE 3

Harperizer test on light weight (LW) ceramic vs. conventional media (CM) using two different sizes of aluminum angle.

|  | ⅜ × ⅜ LW | ⅜ × ⅜ CM |
|---|---|---|
|  | (1/16″ × 1″ × 1″ aluminum angle) | |
| Media Loss | 21.32% | 5.47% |
| Metal Loss | 9.69% | 6.95% |
| Efficiency | .4545% | 1.2705% |
| Chips | .02% | 5.58% |
|  | (⅜″ × ⅜″ × ⅜″ alum. angle) | |
| Media Loss | 22.19% | 5.76% |
| Metal Loss | 5.65% | 3.74% |
| Efficiency | .2546% | .6493% |
| Chips | .04% | 5.87% |

As may be seen from Table 3, the conventional media loaded up with aluminum compared to the light weight particles. A significantly higher occurrence of chipping occurred with the conventional media. The finish on the aluminum metal showed a much smoother surface finish (higher RMS) and had a much better radius due to the higher cut rate of the light weight media.

It is to be understood that the embodiment disclosed herein is representative of one of many possible embodiments and modifications thereof, and is intended to be illustrative rather than limited thereto.

What is claimed is:

1. A method for manufacturing abrasive tumbling media consisting of discrete abrasive particles having an essentially uniform size and shape made by firing a formable mixture primarily comprising a clay, a ceramic and mixtures thereof, which method comprises adding at least 15% of a naturally occurring or synthetically produced metal carbonate to said mixture prior to firing to obtain particles having a final fired bulk density below 65 lbs/ft$^3$.

2. The method of claim 1 wherein the carbonate is selected from the group consisting of calcium carbonate, lithium carbonate, magnesium carbonate, zinc carbonate or compounds containing a predominant amount of one or more of these carbonates.

3. The method of claim 2 wherein said mixture contains about 15% to about 25% of the carbonate.

4. The method of claim 3 wherein the final fired bulk density of said particles is between 50–65 lbs/ft$^3$.

5. The method of claim 1 wherein the metal carbonate is selected from the group consisting of calcium carbonate, ground marble and calcite.

6. Ceramic abrasive tumbling media made by the process of claim 1.

7. A composition comprising clay, ceramic and mixtures thereof and at least fifteen weight percent of a metal carbonate.

8. The method of claim 1 wherein said formable mixture is first extruded into a continuous rod having a desired shape which is thereafter cut into the desired length prior to firing.

9. The method of claim 1 wherein said formable mixture is first extruded into a continuous rod which is thereafter press formed into the desired size and shape prior to firing.

10. The method of claim 2 wherein said formable mixture is first extruded into a continuous rod which is thereafter press formed into the desired size and shape prior to firing.

* * * * *